United States Patent Office 3,075,954
Patented Jan. 29, 1963

3,075,954
DIEPOXY SULFONES
Charles W. McGary, Jr., and Charles T. Patrick, Jr., South Charleston, W. Va., assignors to Union Carbide Corporation, a corporation of New York
No Drawing. Filed Mar. 31, 1960, Ser. No. 18,857
22 Claims. (Cl. 260—79.3)

The invention relates to polyepoxy sulfones. In one aspect, this invention relates to a method for preparing polyepoxy sulfones.

The polyepoxy sulfones contemplated in the invention can be characterized by the following formula:

(I)  R—O—X—SO$_2$—X—O—R wherein each R, individually, can be (a) a vic-epoxyalkyl radical in which the vic-epoxy group is at least one carbon atom removed from the oxy group, i.e., —O—, shown in the above formula, (b) a vic-epoxycyclohexyl radical in which the vic-epoxy group is contained in the cycloaliphatic ring and is at least one carbon atom removed from the oxy, —O—, group, (c) a vic-epoxycyclohexylalkyl radical in which the vic-epoxy group is contained in the cycloaliphatic ring, (d) a 3-oxatricyclo[3.2.1.0$^{2,4}$]oct-6-yl radical, (e) a 3-oxatricyclo [3.2.1.0$^{2,4}$]-6-octylalkyl radical, or (f) a 3-oxatetracyclo-[4.4.0.1$^{7,10}$.0$^{2,4}$]-8-undecyl radical; and wherein X is a divalent saturated aliphatic hydrocarbon radical which contains at least 2 carbon atoms, and preferably from 2 to 6 carbon atoms. It should be noted at this time that the expression "vic-epoxy," as used herein including the appended claims, refers to the group

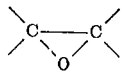

i.e., wherein the oxygen atom is bonded to vicinal carbon atoms. This term "vic-epoxy" is a recognized abbreviation for the expression "vicinal epoxy." The notation that the vic-epoxy group is contained in the cycloaliphatic ring indicates that the carbon atoms of said vic-epoxy group form a part of the cycloaliphatic ring or nucleus. In addition, the expression "lower alkyl," as used herein including the appended claims, refers to a monovalent saturated aliphatic hydrocarbon radical which contains from 1 to 4 carbon atoms. Moreover the "alkyl" moiety in the expression "vic-epoxycycloalkylalkyl" indicates that this moiety preferably contains up to 7 carbon atoms, is monovalently bonded to the "vic-epoxycycloalkyl" group, and also, is monovalently bonded to the oxy group, i.e., —O— group.

With reference to Formula I supra, illustrative R variables include, among others, 2,3-epoxypropyl,
2,3-epoxybutyl,
2-methyl-2,3-epoxypropyl,
2-methyl,2,3-epoxybutyl,
2,3-epoxypentyl,
2,3-epoxyhexyl,
2,3-epoxyoctyl,
4,5-epoxyhexyl,
4,5-epoxypentyl,
5,6-epoxyoctyl,
10,11-epoxyundecyl,
9,10-epoxydecyl,
9,10-epoxyoctadecyl,
3,4-epoxycyclohexyl,
3-ethyl-3,4-epoxycyclohexyl,
4-methyl-2,3-epoxycyclohexyl,
6-n-butyl-3,4-epoxycyclohexyl,
5-amyl-3,4-epoxycyclohexyl,
2,4-diethyl-3,4-epoxycylohexyl,
3,4-epoxycyclohexylmethyl,
2-n-propyl-3,4-epoxycyclohexylmethyl,
5-ethyl-3,4-epoxycyclohexylpropyl,
3,4-epoxycyclohexylamyl,
3-oxatricyclo[3.2.1.0$^{2,4}$]-6-octyl,
7-methyl-3-oxatricyclo[3.2.1.0$^{2,4}$]-6-octyl,
7-hexyl-3-oxatricyclo[3.2.1.0$^{2,4}$]-6-octyl,
3-oxatetracyclo[4.4.0.1$^{7,10}$.0$^{2,4}$]-8-undecyl, and the like. Representative X radicals include, for instance, ethylene, propylene, tetramethylene, pentamethylene, and the like.

Illustrative subclasses of diepoxy sulfones include, for example, bis(vic-epoxyalkyloxyalkyl) sulfone,
bis(vic-epoxycyclohexyloxyalkyl) sulfone,
bis(lower alkyl substituted vic-epoxycyclohexyloxyalkyl) sulfone,
bis(vic-epoxycyclohexyl-alkyloxyalkyl) sulfone,
bis(lower alkyl substituted 3-oxatricyclo[3.2.1.0$^{2,4}$]-6-octyloxyalkyl) sulfone,
bis(3-oxatetracyclo[4.4.0.1$^{7,10}$.0$^{2,4}$] - 8 - undecyloxyalkyl) sulfone,
vic-epoxyalkyloxyalkyl 3-oxatricyclo[3.2.1.0$^{2,4}$]-6 - octyloxyalkyl sulfone,
vic-epoxycyclohexyloxyalkyl 3-oxatetracyclo-[4.4.0.1$^{7,10}$.0$^{2,4}$]-8-undecyloxyalkyl sulfone,
and the like.

Specific examples of diepoxy sulfones include, for instance, bis(2,3-epoxypropoxyethyl) sulfone,
bis(2,3-epoxypropoxypropyl) sulfone,
bis(2,3-epoxypropoxybutyl) sulfone,
bis(2-methyl-2,3-epoxypropoxyethyl) sulfone,
bis(2-ethyl-2,3-epoxyhexoxyethyl) sulfone,
bis(9,10-epoxyoctadecoxy-propyl) sulfone,
bis(10,11-epoxyundecovybutyl) sulfone,
bis(3,4-epoxycyclohexyloxypropyl) sulfone,
bis(2-methyl-3,4-epoxycyclohexoxyethyl) sulfone,
bis(2,5-dimethyl-3,4-epoxycyclohexoxypropyl) sulfone,
bis(2,3-epoxycyclohexylmethoxyethyl) sulfone,
bis(2,methyl-2,3-epoxypropoxyethyl) sulfone,
bis(lower alkyl substituted 3,4-epoxycyclohexylmethoxypropyl) sulfone,
bis(3-oxatricyclo[3.2.1.0$^{2,4}$]-6-octoxyethyl) sulfone,
bis(3-oxatetracyclo[4.4.0.1$^{7,10}$.0$^{2,4}$] - 8 - undecoxypropyl) sulfone,
2,3-epoxypropoxyethyl 2,3-epoxyhexoxyethyl sulfone,
2,3-epoxypropoxyethyl 3-oxatricyclo[3.2.1.0$^{2,4}$]-6-octoxypropyl sulfone,
2-ethyl-2,3-epoxyhexoxypropyl 3,4-epoxycyclohexoxyethyl sulfone,
9,10-epoxyoctadecoxypropyl 2-methyl - 3,4 - epoxycyclohexoxyethyl sulfone, and the like.

The diepoxy sulfones employed as a component in the novel compositions of the invention can be prepared by various routes. One route involves the reaction of, for example, divinyl sulfone with an alkenyl alcohol, cyclohexenol, polycyclohexenol, etc., at elevated temperature, e.g., about 50° to 100° C., in the presence of a basic catalyst, to produce the corresponding mono- or diether sulfone depending upon the concentration of the reactants. For example, greater than two mols of ethylenically unsaturated alcohol (ROH) per mol of divinyl sulfone will give the diether sulfone as illustrated in the following equation below.

2ROH+(CH$_2$=CH)$_2$SO$_2$→
RO—CH$_2$CH$_2$SO$_2$CH$_2$CH$_2$—OR

The use of less than one mol of ethylenically unsaturated alcohol (ROH) per mol of divinyl sulfone results in the monoether sulfone as shown below.

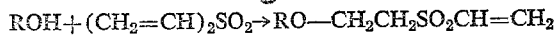
$$ROH + (CH_2=CH)_2SO_2 \rightarrow RO-CH_2CH_2SO_2CH=CH_2$$

The resulting monoether sulfone product then can be reacted with a molar excess of a different ethylenically unsaturated alcohol (R'OH) to produce an unsymmetrical diether sulfone as follows:

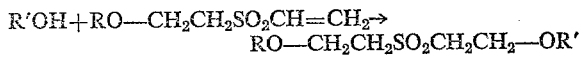
$$R'OH + RO-CH_2CH_2SO_2CH=CH_2 \rightarrow$$
$$RO-CH_2CH_2SO_2CH_2CH_2-OR'$$

The resulting bis(ethylenically unsaturated ether) sulfone then can be reacted with a solution of peracid, e.g., perbenzoic acid, peracetic acid, perpropionic acid, in an inert normally-liquid organic vehicle, e.g., ethyl acetate, acetone, etc., at a temperature in the range of from about 0° to about 100° C., preferably from about 20° to about 80° C., for a period of time sufficient to introduce oxirane oxygen at the site of both carbon to carbon double bonds of the sulfone reagent. Periodic analysis of samples of the reaction mixture to determine the quantity of peracetic acid consumed during the diepoxidation reaction can be readily performed by the operator by well-known procedures. Theoretically, to effect substantially complete diepoxidation of the di(olefinically unsaturated) sulfone reagent, at least a stoichiometric quantity of peracetic acid per carbon to carbon double bond of sulfone reagent should be employed. The organic vehicle and acetic acid by-product can be recovered from the reaction product mixture, for example, by distillation under reduced pressure. If desired, the residue product can be subjected to fractional distillation, crystallization, and the like to obtain the diepoxy sulfone product in high purity. The symmetrical and unsymmetrical sulfones also can be prepared by the reaction of alkali metal sulfide with a chlorohydrin, at elevated temperatures, to produce bis(omega-hydroxyalkyl) sulfide which then can be converted to the sodium salt, followed by reacting said salt with an ethylenically unsaturated halide, at elevated temperatures, to give the bis(ethylenically unsaturated ether) sulfide. The following equation illustrates the preparation.

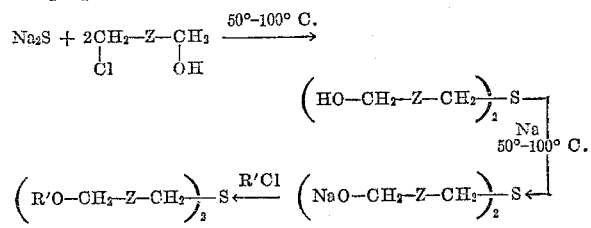

wherein Z represents a single bond bridging the two methylene groups, or it represents a divalent saturated aliphatic hydrogen radical, e.g., alkylene; and wherein R' represents an alkenyl, cycloalkenyl, or polycycloalkenyl in which the ethylenic bond, >C=C<, is at least one carbon atom removed from the chloro radical. The bis-(ethylenically unsaturated ether) sulfide then can be reacted with at least 4 mols of peracid per mol of sulfide under the operative conditions noted in the epoxidation process discussed supra. In this reaction, the sulfide moiety, i.e., —S—, is oxidized to the sulfonyl group, i.e., —SO₂—, and oxirane oxygen is introduced at the site of both carbon to carbon double bonds of the sulfide reagent.

The polyepoxy sulfone(s) of the invention can be polymerized in the presence of a catalytic quantity of a catalyst described hereinafter to produce useful products ranging from viscous liquids to tough, hard resins. A single diepoxy sulfone or a mixture of at least two diepoxy sulfones can be employed in the polymerization reaction. In general, when two diepoxy sulfones are employed, the concentration of the monomer can vary over the entire range, preferably from 5 to 95 weight percent. It is advantageous to add a catalyst in the temperature range from about 10 to about 100° C., preferably with agitation, to insure homogeneity of the resulting admixture. For solid diepoxy sulfone(s), the catalyst is added at higher temperatures to obtain a uniform melt. Catalyst concentrations can be varied over a broad range and can be selected on the basis of the rate of polymerization desired and the polymerization temperature to be used. It has been found that catalyst concentrations from about 0.005 to 15 weight percent, preferably from about 0.01 to 5 weight percent, based on the weight of the monomer(s) used may be employed. The period of time required for the polymerization reaction can range from several minutes to 24 hours, and longer depending on concentration of catalyst, temperature, catalyst, and the diepoxy monomer(s), among other factors.

Basic and acidic catalysts which can be employed in the curable compositions include, for example, the metal halide Lewis acids, e.g., boron trifluoride, aluminum chloride, zinc chloride, stannic chloride, ferric chloride, boron trifluoride-piperidine complex, boron trifluoride-1,6-hexanediamine complex, boron trifluoride-monoethylamine complex, boron trifluoride-dimethyl ether complex, boron trifluoride-diethyl ether complex, boron trifluoride-dipropyl ether complex, and the like; the strong mineral acids, e.g., sulfuric acid, phosphoric acid, polyphosphoric acid, perchloric acid, and the like; the saturated aliphatic hydrocarbon sulfonic acids and the aromatic hydrocarbon sulfonic acids, e.g., ethylsulfonic acid, propylsulfonic acid, benzenesulfonic acid, toluenesulfonic acid, naphthalenesulfonic acid, lower alkyl substituted-benzenesulfonic acid, and the like; and the alkali metal hydroxides, e.g., sodium hydroxide, potassium hydroxide, and the like. When the catalyst and monomers are immiscible, the catalyst can be added as a solution in an inert normally-liquid organic medium. Typical media for the catalysts include the organic ethers, e.g., diethyl ether, dipropyl ether, and the like; the organic esters, e.g., methyl acetate, ethyl acetate, methyl propionate, ethyl propionate, and the like; the organic ketones, e.g., acetone, cyclohexanone, methylcyclohexanone, and the like.

The hard infusible resin products obtained are suitable for use in castings which can be machined to make a variety of useful products such as buttons, electrical components, and the like.

The compounds of the invention are useful as modifying and plasticizing agents for certain types of synthetic condensation resins and are also useful as stabilizers for various synthetic resins. Due to the presence of the vicinal-epoxy group

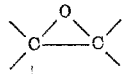

the novel compounds of the invention possess useful solvent properties. For example, they are compatible with many vinyl chloride and vinylidene chloride resins. Accordingly, the compounds of the invention can be used as plasticizers for these and other resins. By incorporating into the resin from about 5 to 50 percent by weight of these novel epoxides, a plasticized product is obtained which possesses useful resilient and flexible characteristics. The vinyl halide resins which can be satisfactorily plasticized by the compounds of this invention can be any vinyl halide polymer such as poly(vinyl chloride), vinyl chloride-vinyl acetate copolymers, vinyl chloride-acrylonitrile copolymers, vinyl chloride-vinylidene chloride copolymers, vinyl chloride-vinylidene chloride-acrylonitrile copolymers and the like. The compounds of this invention may be used alone or in conjunction with conventional plasticizers. In addition to their use as plasticizers, the compounds of this invention can be employed as stabilizers for chlorine-containing resins where they are effective even at low concentrations. Furthermore, the compounds of this invention can be reacted with active organic hardeners, e.g., polycarboxylic acids, polycarboxylic acid anhydrides, polyhydric alcohols, polyhydric phenols, and the like, to form resins useful in the molding, laminating, and encapsulating arts.

The following examples will serve to illustrate the practice of the invention:

Example I

To a round-bottomed flask, 432 grams (6 mols) of methallyl alcohol and 7.2 grams of sodium hydroxide were added. To this mixture at 70° C., there were added slowly 236 grams (2 mols) of divinyl sulfone. The addition of the hydroxyl group to the vinyl group was exothermic and the reaction was maintained at about 70° C. by either heating or cooling. The mixture was maintained at 70° C. for 10 hours after which time the system was cooled and neutralized with hydrochloric acid. The excess methallyl alcohol (165 grams) was removed by vacuum distillation and the product was then flash distilled (boiling point 153° C./1.5 millimeters Hg) giving 411 grams of material having an unsaturation analysis (bromide) of 140 grams per double bond (calculated 131 for bis(2-methallyloxyethyl) sulfone) and a refractive index at 30° C. of 1.4738.

The epoxidation of the diene was carried out in the following manner. A weight of 180 grams of bis(2-methylallyloxyethyl) sulfone was maintained at 30° to 40° C. while 451 grams of a solution of peracetic acid (27.8 percent) in ethyl acetate was slowly added. After 11 hours, analysis of the mixture for peracetic acid indicated that 89.7 percent of the diene had been diepoxidized. The acetic acid and ethyl acetate were removed by azeotropic distillation with ethylbenzene while maintaining the kettle temperature at 55° C. The residue product had a purity of 56.7 percent as bis(2-methyl-2,3-epoxypropoxyethyl) sulfone (pyridine hydrochloride method of analysis).

Example II

The procedure was repeated as outlined in Example I except that the following materials were used:

236 grams (2 mols) of divinyl sulfone
744 grams (6 mols) of 6-methyl-3-cyclohexenylmethanol
0.72 gram of potassium hydroxide After the reaction was essentially complete the excess alcohol was removed by distillation and 714 grams of residue product was obtained. The bis(6-methyl-3-cyclohexenylmethoxyethyl) sulfone was 96.2 percent pure according to an unsaturation analysis.

The epoxidation was carried out as outlined in Example I using:

316 grams of bis(6-methyl-3-cyclohexenylmethoxyethyl) sulfone
157 grams of peracetic acid (566 grams of a 27.7 percent solution in ethyl acetate)

After ten hours at 40° C., analysis indicated that 91 percent of the theoretical amount of peracetic acid had been consumed. The product was recovered (356 grams) as outlined in Example I. The diepoxide (bis(3,4-epoxy-6-methylcyclohexylmethoxyethyl) sulfone) was 59.5 percent pure by pyridine hydrochloride analysis.

Example III

The procedure is repeated as outlined in Example I except that the following materials are used:

236 grams (2 mols) of divinyl sulfone
660 grams (6 mols) of bicyclo[2.2.1]5-hepten-2-ol
0.72 gram of potassium hydroxide After the reaction is essentially complete the excess alcohol is removed by distillation. The bis(bicyclo[2.2.1]5-hepten-2-oxyethyl) sulfone is obtained as shown by its infrared spectrum.

The epoxidation is carried out as outlined in Example I:

776 grams of bis(bicyclo[2.2.1]5-hepten-2-oxyethyl) sulfone
388 grams of peracetic acid (1620 grams of a 24.0 percent solution in ethyl acetate)

After 20 hours at 40° C., analysis indicates that approximately theoretical peracetic acid is consumed. The product is recovered as outlined in Example I. The diepoxide (bis(3-oxatricyclo[3.2.1.0$^{2,4}$]6-octoxyethyl) sulfone) is obtained as shown by its infrared spectrum.

In an analogous manner as described in Example III, the following diepoxy sulfones are prepared: bis(3,4-epoxycyclohexoxypropyl) sulfone; bis(3-oxatetracyclo[4.4.0.1$^{7,10}$.0$^{2,4}$]8-undecoxypropyl) sulfone; 2-ethyl-2,3-epoxyhexoxypropyl 3,4-epoxycyclohexoxypropyl sulfone; and 9,10-epoxyoctadecoxypropyl 2-methyl-3,4-epoxycyclohexoxyethyl sulfone.

Example IV

Bis(2,3-epoxy-2-methylpropylethyl) sulfone (1.0 gram) and 0.01 gram of piperidine-boron trifluoride are mixed in a test tube. The mixture is cured for 21 hours at 120° C. and for six hours at 160° C. There is obtained a hard homopolymeric product.

Example V

Bis(6 - methyl - 3,4 - epoxycyclohexylmethoxyethyl) sulfone (1.0 gram) and 0.003 gram of sulfuric acid as a 15 percent aqueous solution are mixed in a test tube. The mixture is cured for 21 hours at 120° C. and for six hours at 160° C. There is obtained a hard homopolymeric product.

Example VI

Bis(6-methyl3,4-epoxycyclohexylmethoxyethyl) sulfone and 0.003 gram of potassium hydroxide as a 17.2 percent ethylene glycol solution are mixed in a test tube. The mixture is cured for 21 hours at 120° C. and six hours at 160° C. There is obtained a hard homopolymeric product.

Example VII

Bis(3,4-epoxycyclohexoxypropyl) sulfone (1.06 grams) and 0.0006 gram of sulfuric acid as a 5 percent aqueous solution are mixed in a test tube. The mixture is heated for 31 hours at 120° C. and at 160° C. for six hours. There is obtained a hard homopolymeric product.

What is claimed is:

1. A polyepoxy sulfone characterized by the general formula:

R—O—X—SO$_2$—X—O—R wherein each R, individually represents a member selected from the class consisting of (a) a vic-epoxyalkyl radical in which the vic-epoxy group is at least one carbon atom removed from the oxy group, (b) a vic-epoxycyclohexyl radical in which the vic-epoxy group is at least one carbon atom removed from the oxy group, (c) a vic-epoxycyclohexylalkyl radical, the alkyl moiety of which contains up to 7 carbon atoms, (d) a 3-oxatricyclo[3.2.1.0$^{2,4}$]oct-6-yl radical, (e) a 3-oxatricyclo[3.2.1.0$^{2,4}$]oct-6-ylalkyl radical, the alkyl moiety of which contains up to 7 carbon atoms and (f) a 3-oxatetracyclo[4.4.0.1$^{7,10}$.0$^{2,4}$]undec-8-yl radical; and wherein X is a divalent saturated aliphatic hydrocarbon radical which contains from 2 to 6 carbon atoms.

2. A bis(vic-epoxyalkoxyalkyl) sulfone wherein the vic-epoxy moiety is at least one carbon atom removed from the oxy group, and wherein the alkyl moiety contains from 2 to 6 carbon atoms.

3. A bis(vic-epoxycyclohexoxyalkyl) sulfone wherein the vic-epoxy moiety is at least one carbon atom removed from the oxy group, and wherein the alkyl moiety contains from 2 to 6 carbon atoms.

4. A bis(vic - epoxycyclohexylalkoxyalkyl) sulfone wherein the alkoxy moiety contains up to 7 carbon atoms, and wherein the alkyl moiety contains from 2 to 6 carbon atoms.

5. A bis(lower a l k y l substituted 3 - oxatricyclo-[3.2.1.0$^{2,4}$]-6-octoxyalkyl) sulfone wherein the alkyl moiety contains from 2 to 6 carbon atoms.

6. A bis(3-oxatetracyclo[4.4.0.1$^{7,10}$.0$^{2,4}$]-8-undecoxyalkyl sulfone wherein the alkyl moiety contains from 2 to 6 carbon atoms.

7. A vic-epoxyalkoxyalkyl 3-oxatricyclo[3.2.1.0²,⁴]-6-octoxyalkyl sulfone wherein each alkyl moiety contains from 2 to 6 carbon atoms.

8. A vic - epoxycyclohexoxyalkyl 3 - oxatetracyclo [4.4.0.1⁷,¹⁰.0²,⁴]-8-undecoxyalkyl sulfone wherein each alkyl moiety contains from 2 to 6 carbon atoms.

9. Bis(2,3-epoxy-2-methylpropoxyethyl) sulfone.

10. Bis(3,4-epoxy - 6 - methylcyclohexylmethoxyethyl) sulfone.

11. Bis(3 - oxatricyclo[3.2.1.0²,⁴] - 6 - octoxyethyl) sulfone.

12. Bis(3 - oxatetracyclo[4.4.0.1⁷,¹⁰.0²,⁴] - 8 - undecoxypropyl) sulfone.

13. 2-ethyl-2,3-epoxyhexoxypropyl 3,4-epoxycyclohexoxypropyl sulfone.

14. A process for the production of polyepoxy sulfones characterized by the general formula:

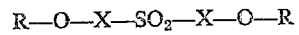

wherein each R, individually represents a member selected from the class consisting of (a) vic-epoxyalkyl radical in which the vic-epoxy group is at least one carbon atom removed from the oxy group, (b) a vic-epoxycyclohexyl radical in which the vic-epoxy group is at least one carbon atom removed from the oxy group, (c) a vic-epoxycyclohexylalkyl radical, the alkyl moiety of which contains up to 7 carbon atoms, (d) a 3-oxatricyclo [3.2.1.0²,⁴]oct-6-yl radical, (e) a 3-oxatricyclo[3.2.1.0²,⁴] oct-6-ylalkyl radical, the alkyl moiety of which contains up to 7 carbon atoms, and, (f) a 3-oxatetracyclo [4.4.0.1⁷,¹⁰.0²,⁴]undec-8-yl radical; and wherein X is a divalent saturated aliphatic hydrocarbon radical which contains from 2 to 6 carbon atoms; which comprises reacting a corresponding polyunsaturated sulfone with an organic peracid at a temperature in the range from about 0° C. to about 100° C. and recovering the polyepoxy sulfone produced.

15. The homopolymer of the polyepoxy sulfone defined in claim 1.

16. The homopolymer of the polyepoxy sulfone defined in claim 2.

17. The homopolymer of the polyepoxy sulfone defined in claim 4.

18. The homopolymer of bis(2,3-epoxy-2-methylpropoxyethyl) sulfone.

19. The homopolymer of bis(6-methyl-3,4-epoxycyclohexylmethoxyethyl) sulfone.

20. A process which comprises reacting a polyepoxy sulfone having the formula:

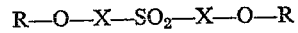

wherein each R, individually represents a member selected from the class consisting of (a) vic-epoxyalkyl radical in which the vic-epoxy group is at least one carbon atom removed from the oxy group, (b) a vic-epoxycyclohexyl radical in which the vic-epoxy group is at least one carbon atom removed from the oxy group, (c) a vic-epoxycyclohexylalkyl radical, the alkyl moiety of which contains up to 7 carbon atoms, (d) a 3-oxatricyclo[3.2.1.0²,⁴]oct-6-yl radical, (e) a 3-oxatricyclo[3.2.1.0²,⁴]oct-6-ylalkyl radical, the alkyl moiety of which contains up to 7 carbon atoms, and (f) a 3-oxatetracyclo[4.4.0.1⁷,¹⁰.0²,⁴]undec-8-yl radical; and wherein X is a divalent saturated aliphatic hydrocarbon radical which contains from 2 to 6 carbon atoms; with a catalyst selected from the group consisting of metal halide Lewis acids, strong mineral acids, the saturated aliphatic hydrocarbon sulfonic acids, the aromatic hydrocarbon sulfonic acids, the alkali metal hydroxides, and the amines at a temperature in the range from about 25° C. to about 250° C., for a period of time sufficient to produce a polymer.

21. The process of claim 20 wherein a mixture of polyepoxy sulfones is employed.

22. A polymer containing a polyepoxy sulfone in polymerized form with a different polyepoxy sulfone, said polyepoxy sulfones conforming to the following structural formula:

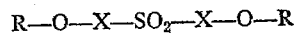

wherein each R, individually represents a member selected from the class consisting of (a) vic-epoxyalkyl radical in which the vic-epoxy group is at least one carbon atom removed from the oxy group, (b) a vic-epoxycyclohexyl radical in which the vic-epoxy group is at least one carbon atom removed from the oxy group, (c) a vic-epoxycyclohexylalkyl radical, the alkyl moiety of which contains up to 7 carbon atoms, (d) a 3-oxatricyclo[3.2.1.0²,⁴]oct-6-yl radical, (e) a 3-oxatricyclo[3.2.1.0²,⁴]oct-6-ylalkyl radical, the alkyl moiety of which contains up to 7 carbon atoms, and (f) a 3-oxatetracyclo[4.4.0.1⁷,¹⁰.0²,⁴]undec-8-yl radical; and wherein X is a divalent saturated aliphatic hydrocarbon radical which contains from 2 to 6 carbon atoms.

References Cited in the file of this patent

UNITED STATES PATENTS

| 2,671,771 | Simons | Mar. 9, 1954 |
| 2,765,322 | Beavers | Oct. 2, 1956 |
| 2,944,871 | Atkinson | July 12, 1960 |

FOREIGN PATENTS

| 1,202,723 | France | Jan. 12, 1960 |